United States Patent

Mund et al.

[11] 4,337,501
[45] Jun. 29, 1982

[54] ELECTROCHEMICAL CAPACITOR

[75] Inventors: Konrad Mund; Gerhard Richter, both of Erlangen; Erhard Weidlich, Spardorf, all of Fed. Rep. of Germany

[73] Assignee: Siemens Aktiengesellschaft, Berlin and Munich, Fed. Rep. of Germany

[21] Appl. No.: 77,623

[22] Filed: Sep. 21, 1979

[30] Foreign Application Priority Data

Sep. 28, 1978 [DE] Fed. Rep. of Germany ....... 2842352

[51] Int. Cl.³ .......................... H01G 9/00; B01J 17/00
[52] U.S. Cl. ..................................... 361/433; 29/570; 429/161
[58] Field of Search ........................ 361/433; 429/161; 29/570

[56] References Cited

U.S. PATENT DOCUMENTS

| | | | |
|---|---|---|---|
| 3,536,963 | 10/1970 | Boos | 361/433 |
| 3,656,027 | 4/1972 | Isler | 361/433 |
| 3,675,087 | 7/1972 | Zykov | 361/433 |
| 3,855,506 | 12/1974 | Halasz et al. | 361/433 |
| 4,009,424 | 2/1977 | Itoh | 361/433 |
| 4,023,079 | 5/1977 | Selover et al. | 361/433 |
| 4,231,076 | 10/1980 | Markarian | 361/433 |

Primary Examiner—Andrew J. James
Attorney, Agent, or Firm—Kenyon & Kenyon

[57] ABSTRACT

The invention relates to an electrochemical capacitor with electrodes of activated carbon. Such a capacitor is to be improved in the sense that the electrodes are mechanically stable and also exhibit a large capacity per unit of area. To this end, the invention provides electrodes which consist of glass carbon activated in concentrated sulfuric acid at temperatures of up to about 330° C. The electrochemical capacitor according to the invention is suitable for use in electric circuits.

1 Claim, 1 Drawing Figure

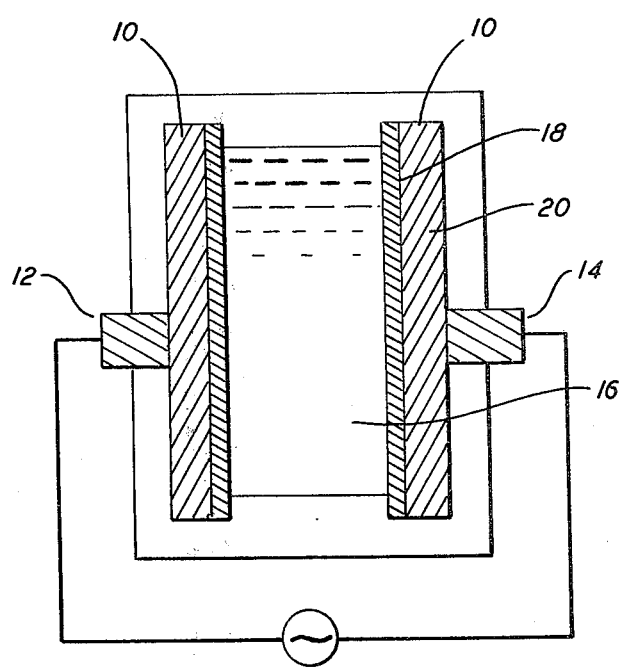

ELECTROCHEMICAL CAPACITOR

BACKGROUND OF THE INVENTION

This invention relates to an electrochemical capacitor with electrodes of activated carbon.

If large capacities per volume are required in electric circuits, electrolytic capacitors are generally employed, specifically, aluminum or tantalum capacitors. In these capacitors, in which the dielectric properties of formed oxide layers are utilized, the capacity per unit of area depends on the forming voltage and reaches values of around 1 $\mu F.cm^{-2}$. An advantage of such capacitors is the high dielectric strength of up to about 500 V.

Larger specific capacities are known from electrochemistry, for example, the double-layer capacity of smooth electrodes with capacities per unit of area up to 50 $\mu F.cm^{-2}$. If such electrodes are used in a capacitor, however, the voltage at a pair of electodes, in the case of an aqueous electrolyte, must not substantially exceed 1 V in order to avoid electrolysis. The capacity of the electrodes can be increased still further if their effective surface is increased. Accordingly, activated carbon has also been proposed as a suitable electrode material (U.S. Pat. Nos. 3,536,963 and 3,652,902).

In the known electro-chemical capacitors which have at least two electrodes consisting of the same material, an insulating separator layer is arranged between the electrodes, and the space between the electrodes as well as the electrode material are filled with electrolyte. It has been found, however, that it is difficult to make thin, mechanically stable layers of activated carbon in powder form. In addition, electrodes of activated-carbon powder have a high diaphragm resistance and thus, the available capacity can be utilized only at very low frequencies.

SUMMARY OF THE INVENTION

It is an object of the present invention to improve electrodes of activated carbon for electrochemical capacitors in such a manner that they can be made thin as well as mechanically stable while exhibiting at the same time a large capacity per unit of area.

According to the invention, this is achieved by the provision that the electrodes consist of glassy carbon activated in concentrated sulfuric acid at temperatures of up to about 330° C.

Glassy or glass carbon, also called vitreous carbon, is obtained by carbonizing three-dimensionally cross-linked plastics such as phenolformaldehyde or furan resins. The vitreous carbon structures produced are micro-crystalline and exhibit only extremely small regions of graphite-like layers. The glass carbon electrodes in the electrochemical capacitor according to the invention are mechanically extremely stable, since glass carbon is very hard and also shows no abrasion.

It was surprising that glass carbon can be used as electrode material for electrochemical capacitors. The surface of the glass carbon is smooth and exhibits no roughness. However, in the activation of the glass carbon, which is accomplished by boiling in concentrated sulfuric acid at temperatures of up to about 330° C., its surface is attacked, i.e., roughened. A roughness factor is obtained by this process which is larger than $10^4$. The capacity, referred to the geometric surface, then yields values of up to 1 $F.cm^{-2}$, depending on the duration of the activation process. The activation time is generally about 10 to 60 minutes and, advantageously, about 50 to 60 minutes.

When the glass carbon is heated in concentrated sulfuric acid, i.e., in about 96 to 98% sulfuric acid, its temperature rises from about 280° C. to about 330° C. The acid is partially decomposed at the surface of the glass carbon, developing gas and attacking the surface of the latter. Individual carbon particles chip off and the acid is colored black. Pictures made under the scanning electron microscope show that glass carbon treated in such a manner has a ragged surface with many crevices. BET (gas absorption) measurements show an internal surface of about 1.6 $m^2$ per $cm^2$ external surface.

DETAILED DESCRIPTION OF THE INVENTION

The invention is described in further detail with reference to the following discussion and experiments.

The FIGURE represents an electrochemical capacitor according to the present invention. The capacitor comprises a pair of spaced-apart electrodes 10 and separate contacts 12 and 14 for each electrode. Electrolyte 16 occupies the area between the electrode pair. The electrodes consist of glass carbon which has been activated by contact with hot, concentrated $H_2SO_4$. As shown in the FIGURE for ease of understanding, the activation may be considered as resulting in the formation of active layer 18 on the electrode (any remaining unactivated glassy carbon being thus a carrier 20 for the active layer 18). In actuality, however, the differentiation between active layer 18 and carrier 20 is not apparent on a macroscopic scale. The electrodes 10 may, of course, consist entirely of activated glassy carbon.

In an electrochemical capacitor constructed from identical electrodes, the essential data (with the exception of the diaphragm resistance) can be obtained from measurements on single electrodes which are preformed in a so-called half-cell arrangement. Such a half-cell comprises a working electrode, a counter electrode and a reference electrode. Separate contacts are provided for the current and the potential measurement.

A rough orientation regarding the potential dependence of the capacity is provided by potentiodynamic measurements, where a potential which is measured against the reference electrode and is varied within a defined interval with constant voltage rate, is impressed on the working electrode by means of a potentiostat and a delta voltage generator. If the current is then recorded as a function of the potential, the capacity can be determined readily from the shape of the constant cycles. If the delta voltage generator is replaced by a frequency generator, then the impedance can be determined as a function of the frequency. A frequency response analyzer, for example, is suited for the measurements. The impedance measurements were carried out at the rest potential of the electrodes ($\phi/H_2, _{rev}$=0.8 V) with an amplitude of the a-c voltage of 2 to 30 mV.

A capacitor was constructed from two identical electrodes, and a diaphragm of regenerated cellulose was arranged between the two electrodes. Before it was inserted, the diaphragm was impregnated with electrolyte, 6 m KOH or 2.5 m $H_2SO_4$, respectively. The diaphragms were 100 $\mu m$ thick and had a surface resistance of 40 to 60 mohm.$cm^2$ at 22° C. Membrane filters of cellulose ester which are only 25 $\mu m$ thick and have a lower resistance can also be used.

The electrodes were pressed onto the diaphragm by means of a die (effective contact pressure: 1 bar). Separate contacts were provided for the electrodes for the current supply and the voltage measurement. In determining the impedance of the capacitor, the signal of a frequency generator was fed to a potentiostat. A frequency response analyzer furnished the magnitude of the impedance and the phase angle.

The measurements were performed on the following electrode materials: Activated-carbon powder, carbon diaphragms, glass carbon (untreated) and activated glass carbon.

1. Activated-Carbon Powder

Activated carbon is commercially available as powder with BET surfaces between 30 and 1700 $m^2/g$. To measure the capacity, powder electrodes in the form of so-called supported electrodes were prepared from different powders (BET-surface between 600 and 1300 $m^2/g$) which, together with an asbestos cover layer, were built into an electrode mount (coating: 1 $mg/cm^2$). The impedance measurements (half-cell arrangement) were performed at a frequency of 0.05 Hz; as electrolyte served 2.5 m $H_2SO_4$ and 6 m KOH.

The area capacities determined on the activated-carbon powders are between 0.04 and 0.1 $F.cm^{-2}$. With electrodes of soot, a capacity of 0.02 $F.cm^{-2}$ was determined. However, the diaphragm resistance is so high that the capacity can be utilized only at frequencies below 0.1 Hz. In addition, it was not possible to apply and bind the powders uniformly.

2. Carbon Diaphragms

Commercially available porous carbon diaphragms with a thickness of 0.5 mm were used. The material had a BET surface of 76 $m^2/g$. The electrodes were activated in air for 2 hours at 500° C., which increased the BET surface to 124 $m^2/g$.

The investigations (2.5 m $H_2SO_4$) showed that an acceptable loss factor with a-c is obtained only at frequencies below 1 Hz. The electrodes are too thick, and to obtain frequencies of technical interest, the carbon diaphragms would require a thickness one-tenth of the present thickness.

3. Glass Carbon (untreated)

From the measurements on single electrodes (2.5 m $H_2SO_4$, 22° C.), one obtains for a capacitor with two electrodes of untreated, i.e., non-activated, glass carbon, with a resistance of the diaphragm of about 50 $mohm.cm^2$, a capacity of 6 $\mu F.cm^{-2}$ at a frequency of 1 Hz and a capacity of 2 $\mu F.cm^{-2}$ at a frequency of 10 Hz.

4. Activated Glass Carbon

For activating the glass carbon, the electrodes are placed in cold concentrated sulfuric acid and are heated therein to a temperature of about 325° C. The electrodes remain in the acid at this temperature for a predetermined time and are subsequently cooled therein to room temperature.

On glass carbon electrodes activated in this manner, the influence of the activation time (t) on the capacity (c) was investigated first by means of potentiodynamic measurements. Rough proportionality was found:

| t (min) | 0 | 10 | 30 | 60 |
|---|---|---|---|---|
| c $(F \cdot cm^{-2})$ | $4\ 10^{-3}$ | 0.118 | 0.54 | 0.86 |

Since in the activation in boiling sulfuric acid the gas development sets in first at faults of the electrode surface, it has been found to be advantageous to sandblast the electrode material before it is activated, so as to obtain an activated layer as uniform as possible.

The impedance measurements on electrodes of activated glass carbon were performed at 22° C. in 2.5 m $H_2SO_4$ as the electrolyte. As explained earlier, capacity values of up to 1 $F.cm^{-2}$ were obtained from the data of the impedance measurements, which is a considerable increase over the untreated glass carbon electrodes.

Tests on a simple capacitor with two electrodes of activated glass carbon, between which a membrane filter of regenerated cellulose had been arranged, showed a diaphragm resistance of about 50 $mohm.cm^{-2}$ (2.5 m $H_2SO_4$). At a frequency of 20 Hz, a loss factor tan $\delta = 1$ was obtained. After such a capacitor was charged galvanostatically (i=10 $mA.cm^{-2}$), a 50% discharge time of $1.6 \times 10^4$ sec was obtained for the self-discharge.

The voltage at an electrochemical capacitor of two glass carbon electrodes must not substantially exceed the value 1 V if corrosion and gas development are to be avoided. Since, however, higher voltages are required for practical applications, a capacitor was constructed of five cell elements with two electrodes each (connected in series); maximum voltage: about 10 V. Diaphragms were arranged between the electrodes of a cell and between the individual cells. After this capacitor was charged to a voltage of 10 V, the self-discharge was monitored. After 5 hours, a voltage of 6.5 V was measured i.e., the voltage dropped no faster than in the case of a simple capacitor with a single cell.

The discussion above demonstrates that activated glass carbon is extraordinarily well suited as electrode material for an electrochemical capacitor. The capacitor according to the invention exhibits a large capacity. In spite of the possible disadvantage of the small voltage of 1 V which the electrochemical capacitor according to the invention has as compared to conventional aluminum electrolytic capacitors, this capacitor is far superior to the known capacitors with respect to the attainable energy density. Thus, while an aluminum capacitor furnishes only an energy density of 0.014 $Ws.cm^{-3}$, the high value of 0.6 $Ws.cm^{-3}$ can be obtained with the capacitor according to the invention.

What is claimed is:

1. An electrochemical capacitor comprised of at least one pair of electrodes, said electrodes consisting of glass carbon which has been activated by contact with concentrated sulfuric acid at a temperature of up to about 330° C.

* * * * *